United States Patent
Nakayoshi et al.

(10) Patent No.: US 7,639,324 B2
(45) Date of Patent: Dec. 29, 2009

(54) LIQUID CRYSTAL DISPLAY DEVICE

(75) Inventors: Yoshiaki Nakayoshi, Ooamishirasato (JP); Kazuhiko Yanagawa, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 259 days.

(21) Appl. No.: 11/779,981

(22) Filed: Jul. 19, 2007

(65) Prior Publication Data

US 2009/0091687 A1    Apr. 9, 2009

Related U.S. Application Data

(62) Division of application No. 10/804,105, filed on Mar. 19, 2004, now Pat. No. 7,253,857.

(30) Foreign Application Priority Data

Mar. 20, 2003   (JP)   ............... 2003-078310

(51) Int. Cl.
    G02F 1/1335   (2006.01)
(52) U.S. Cl. .................. 349/108; 349/106; 349/139
(58) Field of Classification Search .................. None
    See application file for complete search history.

(56) References Cited

U.S. PATENT DOCUMENTS

| | | |
|---|---|---|
| 4,333,708 A | 6/1982 | Boyd et al. |
| 5,731,794 A | 3/1998 | Miyazawa |
| 6,124,909 A | 9/2000 | Miyashita et al. |
| 6,222,602 B1 | 4/2001 | Aratani et al. |
| 6,789,910 B2 | 9/2004 | Kimura et al. |
| 6,870,587 B2 | 3/2005 | Shibahara et al. |
| 6,894,745 B2 | 5/2005 | Fujimori et al. |
| 7,002,649 B2 | 2/2006 | Yuuki et al. |

FOREIGN PATENT DOCUMENTS

| | | |
|---|---|---|
| CN | 1118469 A | 3/1996 |
| CN | 1186257 | 7/1998 |
| JP | 11-183892 | 7/1999 |
| JP | 2000-122085 | 4/2000 |
| JP | 2001-272674 | 10/2001 |
| JP | 2002-311432 | 10/2002 |
| JP | 2003-76342 | 3/2003 |

*Primary Examiner*—Richard H Kim
(74) *Attorney, Agent, or Firm*—Antonelli, Terry, Stout & Kraus, LLP.

(57) ABSTRACT

A liquid crystal display device includes at least a liquid crystal display panel, which uses a pair of transparent substrates which are arranged to face each other with liquid crystal disposed therebetween as an envelope, and a light guide plate, which guides light from a light source, being sequentially arranged from a viewer side. The liquid crystal display panel forms light reflection layers on a liquid-crystal-side surface of the light-guide-plate side transparent substrate using portions of respective pixels and forms color filters which face the light reflection layers on the liquid-crystal-side surface of one transparent substrate or a liquid-crystal-side surface of the other transparent substrate which faces the one transparent substrate. Light from the light source is irradiated such that respective colors thereof, which constitute three primary colors, are sequentially changed over.

6 Claims, 10 Drawing Sheets

PIX

CF

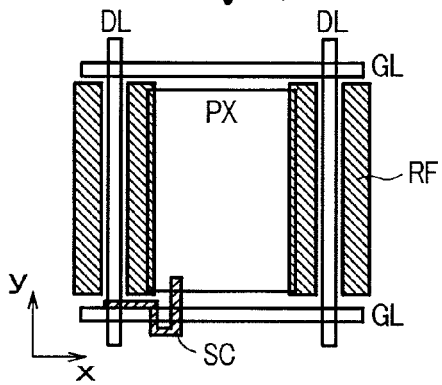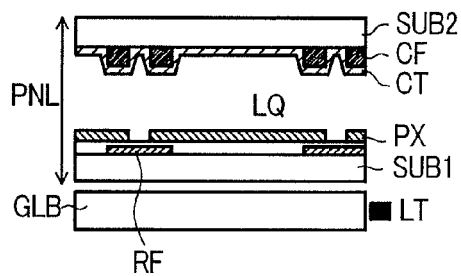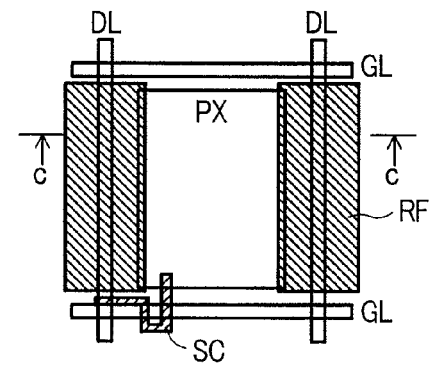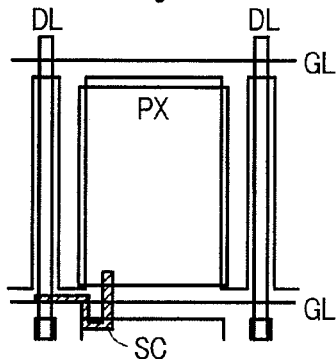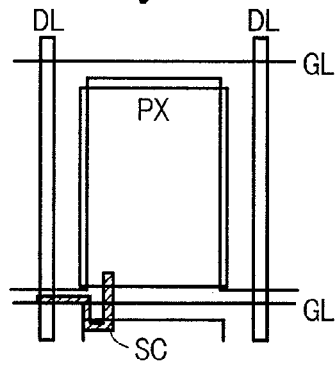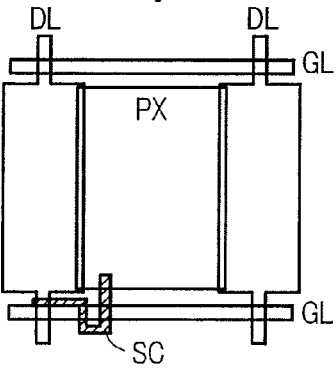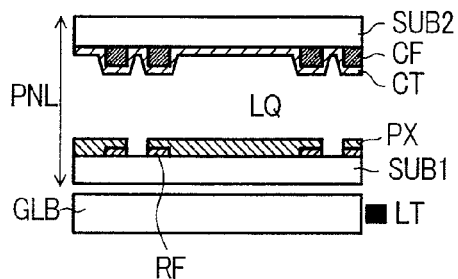

LIQUID CRYSTAL DISPLAY DEVICE

CROSS REFERENCE TO RELATED APPLICATION

This application is a divisional application of U.S. application Ser. No. 10/804,105, filed Mar. 19, 2004 now U.S. Pat. No. 7,253,857, the contents of which are incorporated herein by reference.

BACKGROUND OF THE INVENTION

The present invention relates to a liquid crystal display device, and, more particularly, to a color liquid crystal display device which produces a display based on a so-called field sequential method.

A color liquid crystal display device of the type which employs a field sequential method is configured to time-sequentially change over the light which passes through each pixel one after another among, for example, a red light, a green light and a blue light; and, at the same time, it operates to supply video signals for red, green and blue colors to respective pixels at the timing of the changing over of the lights. Accordingly, although the viewer of a color liquid crystal display device of this type receives the respective red, green and blue lights on which the pixel information is carried, respectively, in a time-sequentially separated manner, the viewer perceives the received lights in a mixed color state.

Here, such a color liquid crystal display device requires a light source which is capable of individually irradiating red, green and blue lights. Accordingly, the color liquid crystal display device is configured such that, when the driving of the light source is stopped and the color liquid crystal display device is driven using ambient light (white light), such as light from the sun, a color display cannot be produced.

However, when such a color liquid crystal display device is used as a display device in a mobile phone, for example, and the liquid crystal display device is in a waiting mode or is used for a long time outdoors, there exists a strong demand for the realization of a color display using ambient light (white light), such as sun light.

As a display device which can satisfy such a demand, there is a known display device which produces a color display using a white ambient light by providing color filters on an outer portion of a liquid crystal display panel (a liquid crystal cell) and by mechanically moving the color filters with respect to the respective pixels (see patent literature 1).

[Patent Literature 1]
Japanese Unexamined Patent Publication 2002-328355

However, such a liquid crystal display device has a drawback in that the liquid crystal display device includes the mechanical operation of color filters, and, hence, the liquid crystal display device exhibits poor reliability in operation. The liquid crystal display device also has a drawback in that the liquid crystal display device includes a mechanical device for moving the color filters, and, hence, there exists a limit with respect to the miniaturization of such a device.

The present invention has been made under such circumstances, and it is an object of the present invention to provide a liquid crystal display device which can exhibit a high reliability and can achieve a desired miniaturization by eliminating the ease of a mechanical operating mechanism in the liquid crystal display panel.

SUMMARY OF THE INVENTION

A summary of representative Examples of the invention disclosed in this specification is as follows.

Means 1.

In a liquid crystal display device according to the present invention, at least a light guide plate which guides light from a light source, a liquid crystal display panel, an optical medium which changes over transmission and reflection of light, color filters and a reflector are sequentially arranged from a viewer side, the color of light from the light source is sequentially changed over to provide respective colors which constitute three primary colors, pass through the liquid crystal display panel and, thereafter, are reflected toward the viewer side by the optical medium, and at the same time, the color filters are constituted of color filters of respective colors which are arranged to face at least three pixels formed on the liquid crystal display panel which are disposed close to each other and the respective colors constitute the three primary colors, and the reflector reflects an ambient light which is made to pass through the light guide plate, the liquid crystal display panel, the optical medium and the color filters to the viewer side.

Means 2.

The liquid crystal display device according to the present invention is, for example, on the premise of the constitution of means 1, characterized in that the color filters are formed on a surface of the reflector.

Means 3.

The liquid crystal display device according to the present invention is, for example, on the premise of the constitution of means 1, characterized in that the liquid crystal display device includes a display control circuit and an ON/OFF state of the light source is determined by the display control circuit, wherein when the light source is in the ON state, video signals of the colors corresponding to lights of respective colors from the light source are supplied to respective pixels in response to the changeover of lights of respective colors, and when the light source is in the OFF state, video signals of colors corresponding to the colors of the color filters which are arranged to face at least three respective pixels disposed close to each other are supplied to the respective pixels.

Means 4.

The liquid crystal display device according to the present invention is, for example, on the premise of the constitution of means 3, characterized in that when the light source is in the ON state, among at least three pixels which are disposed close to each other, the video signals which are supplied to the pixels other than the selected pixels which are small in number than the three pixels are removed for thinning.

Means 5.

In a liquid crystal display device according to the present invention, for example, at least a liquid crystal display panel which uses transparent substrates which are arranged to face each other with liquid crystal therebetween as an envelope and a light guide plate which guides light from a light source are sequentially arranged from a viewer side, the liquid crystal display panel forms light reflection layers on a liquid-crystal-side surface of the light-guide-plate side transparent substrate using portions of respective pixels and forms color filters which face the light reflection layers on the liquid-crystal-side surface of the transparent substrate or a liquid-crystal-side surface of another transparent substrate which faces the transparent substrate, and light from the light source is irradiated such that respective colors which constitute three primary colors are sequentially changed over.

Means 6.

The liquid crystal display device according to the present invention is, for example, on the premise of the constitution of means 5, characterized in that an area of the reflection layers is set at a rate of equal to or less than ⅓ of an area of regions of the pixels.

Means 7.

The liquid crystal display device according to the present invention is, for example, on the premise of the constitution of means 5, characterized in that each pixel is constituted of a thin film transistor which is turned on in response to the supply of a scanning signal from the gate signal line and a pixel electrode to which a video signal is supplied from a drain signal line through the thin film transistor, wherein the reflection layer is constituted of an extension portion of the gate signal line or the drain signal line.

Means 8.

In a liquid crystal display device according to the present invention, for example, at least a light guide plate which guides lights from a light source, a liquid crystal display panel, an optical medium which changes over transmission and reflection of lights, color filters of respective colors which constitute three primary colors and a reflector are sequentially arranged from a viewer side, the light source irradiates lights such that the irradiated lights are sequentially changed over with respective colors which constitute three primary colors, the liquid crystal display panel is divided into three pixel regions which face the respective colors of the color filters in each pixel, and the liquid crystal display device includes means which simultaneously supplies the video signal to the respective pixel regions and means which independently supplies a black display signal to the respective pixel regions.

Means 9.

The liquid crystal display device according to the present invention is, for example, on the premise of the constitution of means 8, characterized in that the video signal is supplied to respective pixel regions through video signal lines and the black display signal is supplied to the pixel regions through the video signal lines.

Means 10.

The liquid crystal display device according to the present invention is, for example, on the premise of the constitution of means 8, characterized in that when the light is irradiated from the light source, the black display signal is not supplied to the respective pixel regions and, when the light is not irradiated from the light source, the video signal is supplied to the respective pixel regions and, thereafter, the black display signal is supplied to the remaining pixel regions other than the pixel regions which correspond to the color which is allocated to the video signal.

Means 11.

The liquid crystal display device according to the present invention is, for example, on the premise of the constitution of means 8, characterized in that the video signals are supplied to the respective pixel regions through video signal lines and the black display signal is supplied to the respective pixel regions through signal lines which are provided separately from the video signal lines.

Means 12.

In a liquid crystal display device according to the present invention, for example, at least a light guide plate which guides lights from a light source, a liquid crystal display panel, an optical medium which changes over transmission and reflection of lights, color filters of respective colors which constitute three primary colors and a reflector are sequentially arranged from a viewer side, the light source irradiates lights such that the irradiated lights are sequentially changed over among respective colors which constitute three primary colors, the liquid crystal display panel is divided into three pixel regions which face the respective colors of the color filters in each pixel, and the video signal from the same drain signal line is configured to be supplied to respective pixel electrodes of the respective pixel regions through a first thin film transistor which is driven in response to the supply of the scanning signal from the first gate signal line, through a second thin film transistor which is driven in response to the supply of the scanning signal from the second gate signal line, and through a third thin film transistor which is driven in response to the supply of the scanning signal from the third gate signal line.

Means 13.

The liquid crystal display device according to the present invention is, for example, on the premise of the constitution of means 12, characterized in that the video signal includes a black display signal, the respective displays of the respective pixel regions are sequentially performed by changing over the respective displays of the respective pixel regions, and a black display based on the black display signal is performed at the time of changing over the display.

Here, the present invention is not limited to the above-mentioned constitution and various modifications are conceivable without departing from the technical concept of the present invention.

BRIEF DESCRIPTION OF THE DRAWINGS

FIGS. 8A to 8G are diagrams showing various embodiments of the pixel construction in the liquid crystal display device according to the present invention;

DESCRIPTION OF THE PREFERRED EMBODIMENTS

Embodiments of a liquid crystal display device according to the present invention will be explained in conjunction with the drawings.

Embodiment 1

Figure 1A:
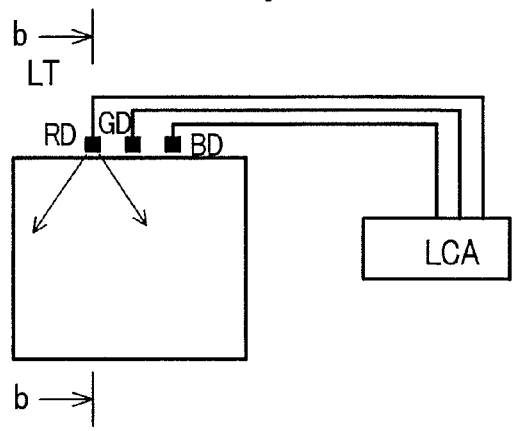
FIG. 1A is a plan view.
Figure 1B:
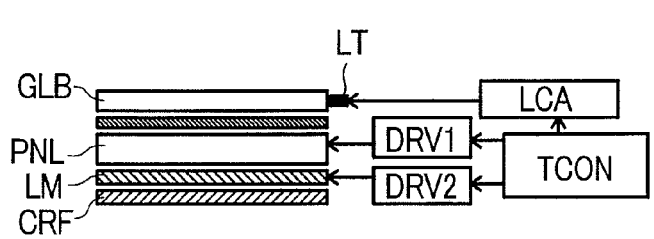
FIG. 1B is a cross-sectional view taken along lien b-b in FIG. 1A
Figure 1C:
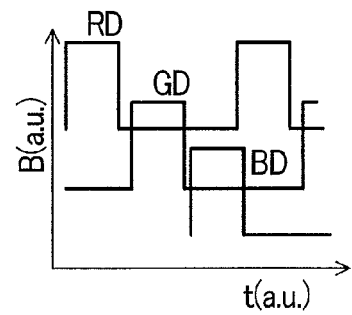
FIG. 1C is a timing diagram showing one embodiment of a liquid crystal display device according to the present invention.

First of all, FIGS. 1A to 1C are directed to one embodiment of the liquid crystal display device according to the present invention, wherein FIG. 1A is a plan view and FIG. 1B is a cross-sectional view taken along a line b-b in FIG. 1A, showing a circuit for supplying signals to parts of the liquid crystal display device.

In FIG. 1B, the liquid crystal display panel PNL is configured such that an envelope is formed of transparent substrates which are arranged to face each other with liquid crystal material disposed therebetween, and the display panel PNL includes a large number of pixels which are arranged in a matrix array.

The liquid crystal display panel PNL is, for example, an active-matrix-type liquid crystal display panel, and it is constituted as a so-called transmissive type. Here, the term "transmissive type" refers to a liquid crystal display panel in which no reflector is provided and which is constituted of pixels which can transmit light from one surface of the liquid crystal display panel PNL to another surface thereof. Further, the liquid crystal display panel PNL includes no color filters in the inside thereof.

Here, the liquid crystal display panel PNL is configured to produce a display upon receiving signals from a driving circuit DRV1, which is driven by a display control circuit TCON.

On a viewer-side surface of the liquid crystal display panel PNL, a light guide plate GLB is arranged by way of a polarization plate POL. The polarization plate POL and the light guide plate GLB are arranged such that both the polarization plate POL and the light guide plate GLB can cover at least the liquid crystal display part of the display panel.

On a side wall surface of the light guide plate GLB, as shown in FIG. 1A, for example, a red light emitting diode RD, a green light emitting diode GD and a blue light emitting diode BD are arranged. These respective diodes are made to emit light using a lighting control device LCA. The lights emitted from the respective diodes RD, GD, BD enter the inside of the light guide plate GLB through a side wall surface thereof, and this light is irradiated to the liquid crystal display device panel PNL side.

The respective diodes RD, GD, BD are configured to emit light in response to signals supplied from the lighting control device LCA, which is driven by the display control circuit TCON. In this case, as shown in FIG. 1C, with the lapse of time, the emission of each light and the extinction of each light are repeated in order the of operation of the red light emitting diode RD, then the green light emitting diode GD and then the blue light emitting diode BD, for example. In FIG. 1C, time t is taken on an axis of abscissas and the brightness B is taken on an axis of ordinates.

On a back surface of the liquid crystal display panel PNL, an optical medium LM is arranged such that the optical medium LM covers at least the liquid crystal display part of the liquid crystal display panel PNL. The optical medium LM is constituted to have the function of a reflector and the function of a light transmitting plate by switching. That is, the optical medium LM function as a light transmitting plate when used in a light transmitting mode (when the light source LT is turned off) and functions as a reflector when used in a light reflecting mode (when the light source LT is turned on). The switching of the respective functions of the optical medium LM is performed in response to signals supplied from a driving circuit DRV2, which is driven by the display control circuit TCON.

On a back surface of the optical medium LM, a colored reflector CRF is arranged such that the colored reflector CRF covers at least the liquid crystal display part of the liquid crystal display panel PNL. The colored reflector CRF is provided with color filters on a surface thereof which faces the optical medium LM, for example. Colors of the color filters are red, green and blue, respectively, and the color filters are formed in correspondence to the respective pixels of the liquid crystal display panel PNL.

Figure 2A:
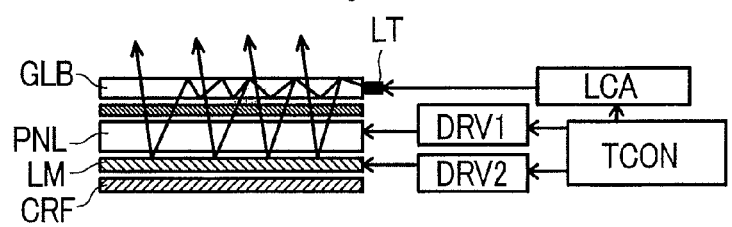
FIGS. 2A and 2B are schematic diagrams showing optical paths during an operation in a reflection mode and in a transmission mode, respectively, of the liquid crystal display device shown in FIG. 1A.
Figure 2B:
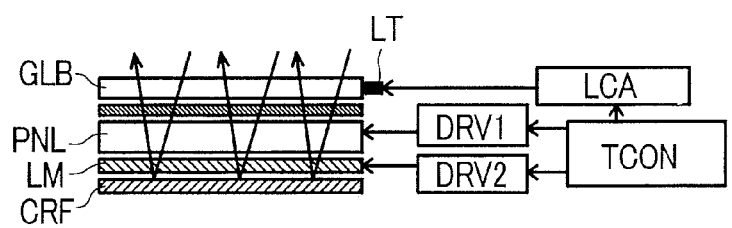

FIG. 2A indicates a case in which the liquid crystal display device is used in the reflection mode, and FIG. 2B indicates a case in which the liquid crystal display device is used in the transmission mode.

First of all, in the reflection mode shown in FIG. 2A, with respect to the respective pixels of the liquid crystal display panel PNL, the optical transmissivity is controlled in response to the image data, light is supplied from the respective diodes RD, GD, BD, and the optical medium LM is set to have the light reflecting function. That is, the lights emitted from the red diode RD, the green diode GD and the blue diode BD are sequentially incident on the liquid crystal display panel PNL in a repeated manner through the light guide plate GLB, and these lights are incident on the optical medium LM through the liquid crystal in the inside of the liquid crystal display panel PNL. Here, at the timing of the incidence of the lights from the respective diodes, the image data for red, green and blue colors are inputted to the liquid crystal display panel PNL, and the respective pixels are driven corresponding to the image data.

The lights incident on the optical medium LM are reflected on the optical medium LM and are made to be irradiated to the viewer side through the liquid crystal in the liquid crystal display panel PNL again and, once again through the light guide plate GLB.

The viewer receives, with respect to the respective pixels, the red, green and blue lights which have passed through the liquid crystal material. Since the lights at this point of time respectively include the pixel information for red, green and blue colors, the viewer can perceive the pixels having a mixed color consisting of a mixture of red, green and blue.

Further, in the transmission mode shown in FIG. 2B, the respective pixels of the liquid crystal display panel PNL are formed such that the optical transmissivity of the liquid crystal is controlled in response to the image data, the supply of light from the respective diodes RD, GD, BD is turned off, and the optical medium LM performs a light transmitting function.

That is, on the liquid crystal display panel PNL, an ambient light, such as sun light or the like, for example, is incident through the light guide plate GLB; and, thereafter, the light is incident on the optical medium LM through the liquid crystal in the liquid crystal display panel PNL. In this case, image data for red, green and blue colors are inputted to the respective neighboring three pixels in the liquid crystal display panel PNL, and the above-mentioned ambient light is made to pass through the liquid crystal of these respective pixels.

The light incident on the above-mentioned optical medium LM is made to pass through the optical medium LM and is reflected on the colored reflector CRF. In this case, on the colored reflector CRF, red filters, green filters and blue filters are formed such that these filters face the respective pixels to which image data for red, green and blue colors are inputted in the liquid crystal display panel PNL.

Then, the light reflected on the colored reflector CRF is irradiated to the viewer side through the optical medium LM, the liquid crystal display panel PNL and the light guide plate GLB.

The viewer receives the red, green and blue light with respect to the neighboring three pixels. At this point of time, since the lights include the respective pixel information for red, green and blue colors, the viewer can perceive the pixels as a mixed color consisting of red, green and blue components.

As clearly understood from the above-mentioned explanation, the liquid crystal display panel PNL is constituted such that, when the liquid crystal display panel PNL is used in the reflection mode, the unit pixel for color display is constituted of one pixel; and, when the liquid crystal display panel PNL is used in the transmission mode, the unit pixel for color display is constituted of at least three pixels.

FIGS. 3A to 3E show an example of the relationship between the pixels of the liquid crystal display panel PNL and the color filters CF of the colored reflector CRF.

Figure 3A:
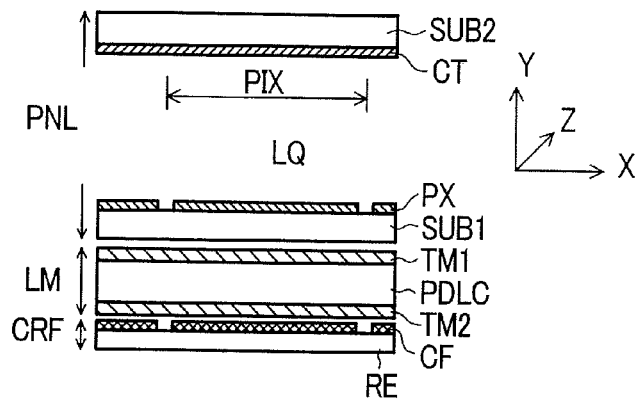
FIG. 3A is a diagrammatic cross-sectional view and FIGS. 3B to 3E are diagrams showing one embodiment of the relationship between a pixel and a colored reflector in the liquid crystal display device shown in FIG. 1A.

First of all, FIG. 3A is a cross-sectional view showing a portion of one pixel of the liquid crystal display panel PNL, as well as the optical medium LM and the colored reflector CRF, which are sequentially arranged on the back surface of the liquid crystal display panel PNL.

In the liquid crystal display panel PNL, the transparent substrates SUB1, SUB2 which are arranged to face each other with the liquid crystal LQ disposed therebetween form an envelope; strip-shaped transparent counter electrodes CT, which extend in the x direction in the drawing and are arranged in parallel in the z direction, are formed on the liquid-crystal-side surface of the transparent substrate SUB2; and strip-shaped transparent pixel electrodes PX, which extend in the z direction in the drawing and are arranged in parallel in the x direction, are formed on the liquid-crystal-side surface of the transparent substrate SUB1.

A crossing portion where the pixel electrode PX and the counter electrode CT are superposed on each other constitutes one pixel, and the optical transmissivity of the liquid crystal of the portion can be controlled by the electric field which is generated at the crossing portion. Here, it is needless to say that, the constitution of the pixel of the liquid crystal display panel PNL is not limited to such a constitution and can adopt another constitution.

Further, in this embodiment, the optical medium LM is constituted such that electrodes TM1, TM2 are formed on respective front and back surfaces of a material layer PDLC; and, by applying a voltage to these electrodes TM1, TM2, the optical medium LM per se functions as a reflector or a light transmitting plate.

Figures 3B, 3C, 3D, 3E:
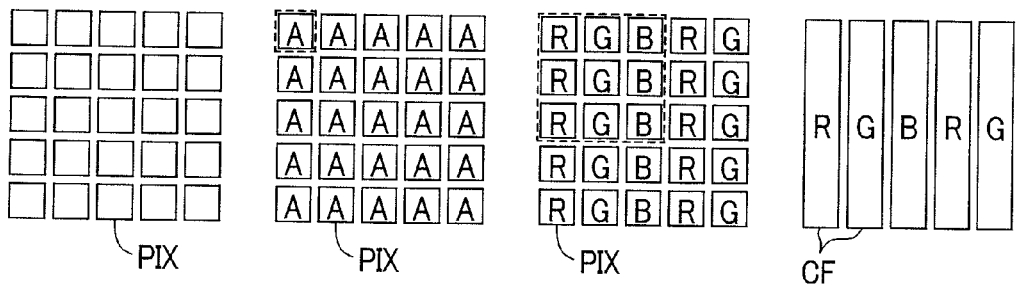

When the liquid crystal display panel PNL is viewed from the y direction side as seen in the drawing, the respective pixels PIX are arranged in a matrix array, as shown in FIG. 3B.

Here, when the liquid crystal display panel PNL is used in the reflection mode (the light source LT being turned on), as shown in FIG. 3C, the unit pixel for color display (the portion surrounded by a dotted line) is constituted of each pixel PIX. This is because the light emitted from the above-mentioned diodes RD, GD, BD repeatedly and sequentially pass through each pixel PIX.

Further, when the liquid crystal display panel PNL is used in the transmission mode (light source LT being turned off), as shown in FIG. 3D, the unit pixel for color display is constituted of, for example, nine pixels PIX which are arranged close to each other (the portion surrounded by a dotted line).

These nine pixels PIX take the form of a 3×3 matrix arrangement; and, out of these nine pixels PIX, three pixels PIX which are arranged in parallel in the z direction as seen at the left side of the matrix arrangement in the drawing are allocated to red, three pixels PIX which are arranged in parallel in the z direction as seen at the center of the matrix arrangement in the drawing are allocated to green, and, further, three pixels PIX which are arranged in parallel in the z direction as seen at the right side of the matrix arrangement in the drawing are allocated to blue.

In this case, the pixel PIX which is allocated to red is the pixel PIX through which the red light passes; and, on the surface of the colored reflector CRF which faces the portion, as shown in FIG. 3E, a red filter FIL is formed.

Similarly, a green filter FIL is formed on the surface of the colored reflector CRF which faces the pixel PIX which is allocated to green, and a blue filter FIL is formed on the surface of the colored reflector CRF which faces the pixel PIX which is allocated to blue.

In such a constitution, when the light source is turned on (the reflection mode), the unit pixel for color display is constituted of one pixel; and, when the light source is turned off (the transmission mode), the unit pixel for color display is constituted of a plurality of pixels (more than three pixels). Hence, a color display can be realized using ambient light. In this case, the ON/OFF operation of the light source LT is controlled by the display control circuit TCON, and, hence, the ON/OFF operation of the light source LT can be easily judged by the display control circuit TCON.

Figure 4A:
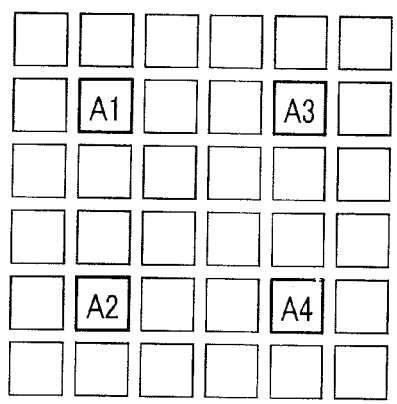
FIGS. 4A and 4B are diagrams showing one embodiment of the manner of producing a display in the reflection mode and in the transmission mode of the liquid crystal display device shown in FIG. 1A.
Figure 4B:
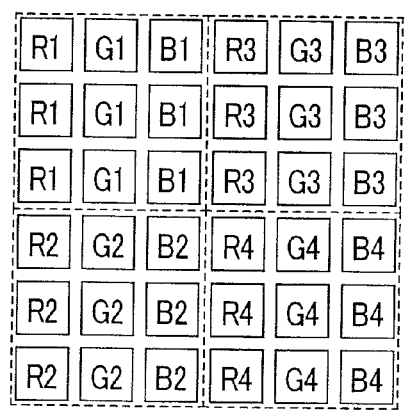

Referring to FIGS. 4A and 4B, as explained above, the number of pixels which constitute a unit pixel for color display is different depending on whether the light source LT is in the ON state or in the OFF state; and, hence, the number of data at the light source ON time may be thinned using the number of the data at the light source OFF time as a reference.

FIG. 4A is a view which shows a portion of the display mode at the light source ON time in which data is supplied to the center pixel (A1, A2, A3, A4) out of the 3×3 matrix arrangement of pixels which are arranged close to each other. That is, the thinning of the data is performed such that the original information can be displayed even when the resolution is decreased. Here, it is needless to say that, besides simple thinning, it is also possible to perform an interpolating calculation for smoothing the data connection.

FIG. 4B is a view which shows a portion of the display mode at the light source OFF time and corresponds to FIG. 4A. In the 3×3 pixels which are arranged close to each other to form a unit pixel for color display, the respective pixels which constitute the same color are displayed by the same data, thus enabling the display of a dedicated screen (a waiting screen).

With such a constitution, the resolution of the display changes between the time when the light source LT is in the ON state and the time when the light source LT is in the OFF state; and, hence, for reducing the difference in the display qualities between these states, it is desirable that the resolution of the original pixel is set high. In this case, it is desirable that, as a pixel size, one pixel is equal to or less than 150 μm, particularly, equal to or less than 100 μm. This is because, since the original pixel size is small, even at the time the light source is OFF, it is possible to prevent an excessive increase of the size of the unit pixel for color display, and, hence, it is possible to prevent the viewer from having an impression that the resolution is degraded. Further, this is because, when the size of one pixel is set equal to or less than 100 μm, the display region size at an enlarged display becomes a size equivalent to so-called 15"XGA; and, hence, it is possible to prevent the viewer from having an impression that the resolution is degraded. In view of the above, a resolution that is equal to or more than ¼VGA, possibly equal to or more than VGA, is desirable.

Figure 5A:
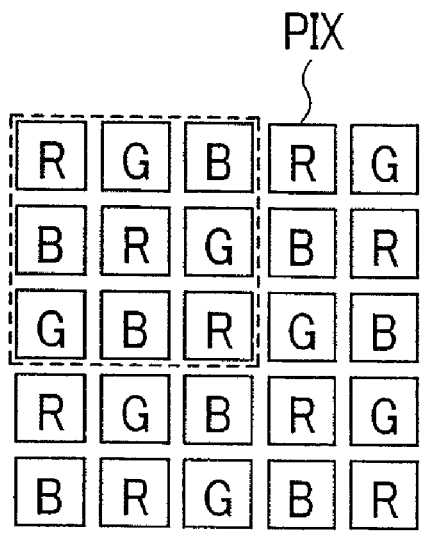
FIGS. 5A and 5B are diagrams showing another embodiment of the relationship between the pixel and the colored reflector in the liquid crystal display device shown in FIG. 1.
Figure 5B:
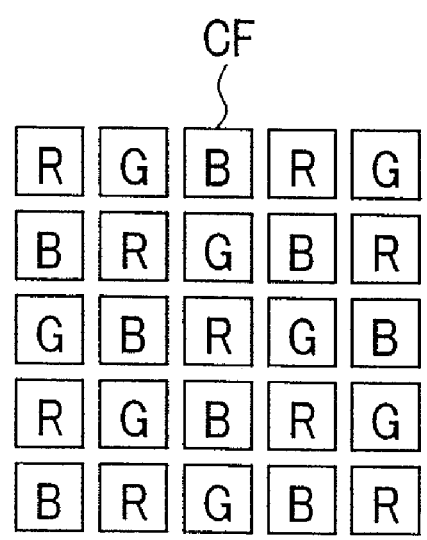

Here, with respect to the case shown in FIG. 4B, in the unit pixel for color display which is constituted of a 3×3 matrix arrangement of pixels, three pixels at the right side are allocated to red, three pixels at the center are allocated to green and three pixels at the left side are allocated to blue. However, it is needless to say that these arrangements may be changed. For example, as shown in FIG. 5A, with respect to the three pixels arranged at the right side, these pixels are respectively allocated to red, blue and green colors from above. With respect to the three pixels at the center, these pixels are respectively allocated to green, red and blue colors from above. Further, with respect to the three pixels at the left side, these pixels are respectively allocated to blue, green and red colors from above. In this case, as shown in FIG. 5B, the respective color filters FIL which are formed on the colored reflector CRF are formed at corresponding portions of the color reflector CRF which face the above-mentioned respective colors to which the respective color filters FIL are allocated. Further, in FIG. 5A, one pixel is displayed using a 3×3 matrix arrangement of pixels. However, it may be possible to adopt a thinning method in which one pixel is displayed using three RGB pixels which are arranged horizontally in a row.

With the above-described constitution, the ratio of arrangement of red, green and blue in the unit pixel for color display becomes uniform, and, hence, the separation of red, green and blue is hardly recognized with naked eye. Accordingly, it appears that light is irradiated from the whole unit pixel whereby the display quality is improved. Here, although the rearrangement of data is necessary in this case, this rearrangement can be easily performed by the display control circuit TCON.

Figure 6:
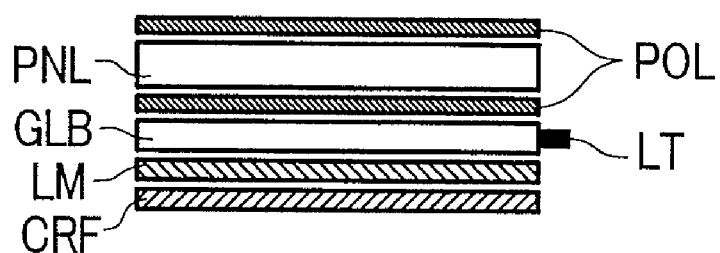
FIG. 6 is a diagrammatical cross-sectional view showing another embodiment of the liquid crystal display device according to the present invention.

Further, in the liquid crystal display device shown in FIG. 1B, the light guide plate GLB is arranged closer to the viewer side than to the liquid crystal display panel PNL. However, as shown in FIG. 6, it is needless to say that the light guide plate GLB may be arranged on the back surface of the liquid crystal display panel PNL and in front of the optical medium LM. This is because such a constitution can obtain similar advantageous effects.

However, in the liquid crystal display device shown in FIG. 1B, even when the thickness of the light guide plate GLB becomes comparatively large, blurring of the reflected light is hardly generated; and, hence, it is possible to obtain an advantageous effect in that the liquid crystal display device can sufficiently cope with a high resolution.

Embodiment 2

Figure 7A:
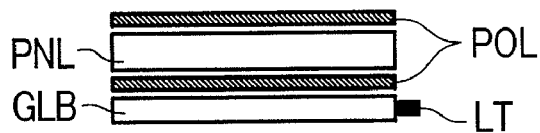
FIGS. 7A to 7D are diagrammatic cross-sectional views showing another embodiment of the liquid crystal display device according to the present invention.

FIG. 7A is a cross-sectional view showing another embodiment of the liquid crystal display device according to the present invention. Compared with the liquid crystal display device shown in FIG. 6, for example, the liquid crystal display device of this embodiment is provided with neither the optical medium LM nor the colored reflector CRF. This is because the respective functions brought about by the optical medium LM and the colored reflector CRF are provided in the inside of the liquid crystal display panel PNL.

Figure 7B:
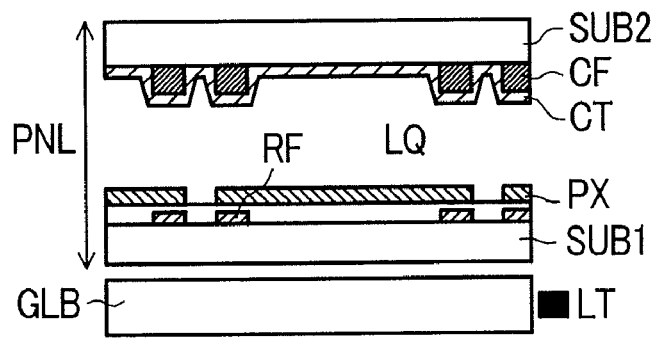

FIG. 7B is a view showing a cross section of a portion of one pixel of the liquid crystal display panel PNL. Here, the light guide plate GLB is arranged on the back surface of the liquid crystal display panel PNL as seen from the viewer side. The constitution of the liquid crystal display panel PNL is substantially equal to the constitution of the liquid crystal display panel shown in FIG. 3A. However, the difference lies in the fact that the liquid crystal display panel PNL is provided with color filters CF and reflection layers RF.

First of all, the color filters CF are formed on portions of the pixels formed on the liquid-crystal-side surface of the transparent substrate SUB2, for example. In the case shown in FIG. 7B, the color filters CF are formed on the liquid-crystal-side surface of the transparent substrate SUB2, and a counter electrode CT is formed such that the counter electrode CT also covers the color filters CF.

Further, reflection layers RF are formed on portions of the pixels formed on the liquid-crystal-side surface of the transparent substrate SUB1, and they are formed in substantially the same pattern at a position facing the above-mentioned color filters CF. With respect to the case of FIG. 7B, the reflection layers RF are formed on the liquid-crystal-side surface of the transparent substrate SUB1 and the pixel electrodes PX are formed on the upper surface of the insulation film, which is formed such that the insulation film also covers the reflection layers RF.

Figure 7C:
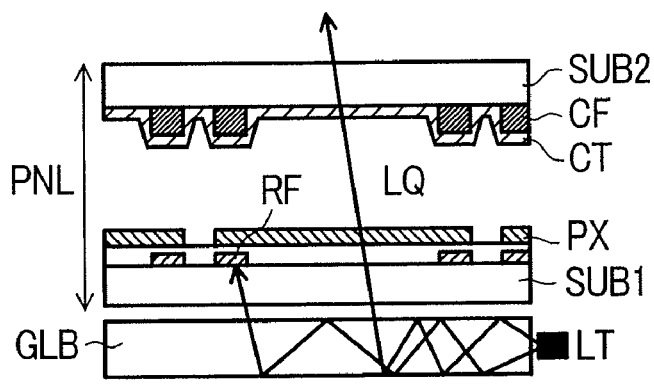

In the liquid crystal display device constituted in such a manner, as shown in FIG. 7C, when the light source LT is turned on, the light from the light source LT which passes through the transparent substrate SUB1 will reach the viewer side through the liquid crystal LQ in a region of the pixel where the above-mentioned reflection layers RF are not formed and pass through the transparent substrate SUB2.

The lights having respective colors of red, green and blue are sequentially changed over and are irradiated from the above-mentioned light source LT; and, hence, even when the lights do not pass through the color filters CF which are formed on the transparent substrate SUB2 side, the viewer can recognize the mixed color.

Figure 7D:
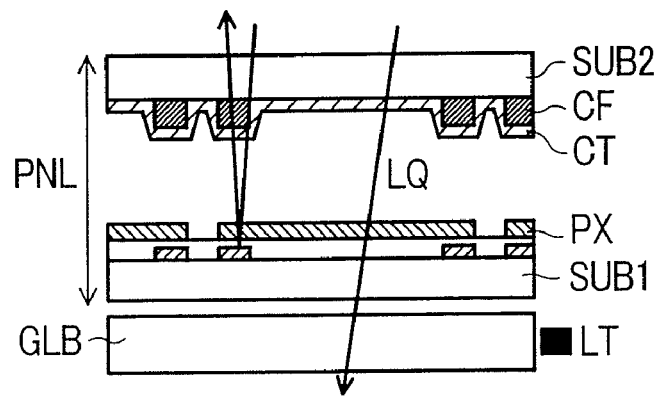

Further, as shown in FIG. 7D, when the light source LT is turned off, with respect to ambient light, such as sun light or the like, the light which passes through the transparent substrate SUB2, the liquid crystal LQ and is reflected on the above-mentioned reflection layers RF passes through the color filters CF which are formed on the transparent substrate SUB2 side and reaches the viewer. In this case, other lights which are not reflected on the above-mentioned reflection layer RF are made to pass through the liquid crystal display panel PNL and the light guide plate GLB, and, hence, these other lights do not reach the viewer.

Here, in the above-mentioned constitution, it is desirable that the regions of the color filters CF have an area approximately ½ to twice as large as the area of the reflection layers RF. Due to such a constitution, it is possible to satisfy the requirements both of the suppression of coloring at the light transmission time and high color purity at the light reflection time.

In this case, an area ratio of the reflection layers RF with respect to the pixel electrodes PX can be suitably selected according to an object of use, that is, according to whether the transmission mode of operation is mainly performed or the reflection mode of operation is mainly performed. In this case, for suppressing the influence of the reflection light during light transmission, it is desirable that the area ratio of the reflection layers RF be set equal to or less than ⅓ with respect to the area of the pixel electrode PX. Due to such a constitution, it is possible to prevent excessive influence of the color of the reflection light with respect to the three respective colors of red, green and blue.

In this manner, in case the color filters CF of one color are formed in each pixel, when the light source LT is turned on, the display of three colors can be obtained with one pixel. On the other hand, when the light source LT is turned off, the display of one color can be obtained with one pixel.

Accordingly, as shown in the embodiment 1, by allocating the color filters having three primary colors to at least three pixels which are arranged close to each other, a unit pixel for color display can be constituted when the light source is turned off.

Further, the color filters CF may be positioned on the same substrate as the light reflection layers RF, provided that the color filters CF are arranged in conjunction with the light reflection layers RF as seen in plan view.

FIG. 8A is a plan view of one pixel as seen when the constitution shown in FIG. 7B is viewed from the liquid crystal side. The pixel PIX is formed so as to be bounded by the gate signal lines GL, which extend in the x direction in the drawing and are arranged in parallel in the y direction, and the drain signal lines DL, which extend in the y direction in the drawing and are arranged in parallel in the x direction. With respect to each pixel PIX, a semiconductor layer SC is formed on a portion of the gate signal line GL (a lower side as seen in the drawing) by way of an insulation film (not shown in the drawing) such that the semiconductor layer SC traverses the gate signal line GL, thus forming a thin film transistor TFT in which the semiconductor layer SC becomes conductive from one end thereof to the other end thereof by supplying the scanning signals to the gate signal lines GL.

One end of the semiconductor layer SC is electrically connected to one drain signal line DL (left side as seen in the drawing) with respect to the pixel PIX, and the other end of the semiconductor layer SC is electrically connected to the pixel electrode PX.

The pixel electrode PX is formed in a major portion at the center of the pixel PIX except for the periphery of the pixel PIX, and the distance between the pixel PX and the drain signal line DL is set comparably larger than the distance between the pixel PX and the gate signal line GL so as to control the periphery thereof.

In the region between the pixel electrode PX and the drain signal line DL, the reflection film RF is formed, and the side of the reflection film RF at the pixel electrode PX side is formed so as to be superposed on the pixel electrode PX. As mentioned above, the area of the reflection films RF is substantially defined by the area of the color filters CF at the transparent substrate SUB2 side.

FIG. 8B is a plan view showing another embodiment of a pixel of the liquid crystal display device according to the present invention, and it may be compared to FIG. 8A. Further, FIG. 8C is a cross-sectional view taken along a line c-c in FIG. 8B.

The constitution which makes the embodiment shown in FIG. 8B different from the constitution of the embodiment shown in FIG. 8A lies in the fact that the reflection film RF which is arranged close to the drain signal line DL is physically connected with, that is, is integrally formed with, the reflection film RF of the adjacent pixel PIX which is arranged close to the pixel PIX. Accordingly, the reflection film RF having such a constitution is formed in a state such that the reflection film RF has a portion thereof superposed on the drain signal line DL. By constituting the liquid crystal display device in such a manner, in the vicinity of both sides of the drain signal line DL, a light shielding function can be obtained. Accordingly, leaking of the light at the portion can be prevented.

Further, FIG. 8D is a plan view showing another embodiment of the pixel of the liquid crystal display device according to the present invention, and it may be compared to FIG. 8A.

The constitution which makes the embodiment shown in FIG. 8D different from the embodiment shown in FIG. 8A lies in the fact that the above-mentioned reflection film RF is positioned on the same layer as the gate signal line GL; and, at the same time, one end of the reflection film RF is physically and electrically connected with the gate signal line GL.

In this embodiment, for example, the reflection film RF is connected with the other gate signal line GL (the gate signal line seen in the upper side in the drawing) which surrounds the pixel together with the gate signal line GL, which drives the pixel. In such a constitution, a side of the reflection film RF at the pixel electrode PX side is superposed on the pixel electrode PX by way of an insulation film (not shown in the drawing), and a capacitive element Cadd can be formed between the pixel electrode PX and the above-mentioned gate signal line GL at the portion.

Here, when the capacitive signal line is formed in the x direction as seen in the drawing within the pixel PIX for forming the capacitive element Cadd, it is needless to say that the capacitive signal line and the reflection film RF may be integrally formed.

FIG. 8E is a plan view showing another embodiment of the pixel of the liquid crystal display device according to the present invention, and it may be compared to FIG. 8B.

In this case also, the above-mentioned reflection film RF is positioned on the same layer as the gate signal line GL; and, at the same time, one end of the reflection film RF is physically and electrically connected to the gate signal line GL. Further, the reflection film RF is formed such that the reflection film RF has a portion thereof superposed on the drain signal line DL, thus providing a light shielding function in the vicinity of both sides of the drain signal line DL.

FIG. 8F is a plan view showing another embodiment of the pixel of the liquid crystal display device according to the present invention, and it may be compared to FIG. 8B.

In the embodiment shown in FIG. 8B, the reflection film RF and the drain signal line DL are formed on different layers. In the embodiment shown in FIG. 8F, on the other hand, the reflection film RF and the drain signal line DL are formed on the same layer and are also formed integrally. Due to such a constitution, the drain signal line DL can be configured to function also as the reflection film RF, and, further, the electrical resistance of the drain signal line DL per se can be decreased.

FIG. 8G is a plan view showing another embodiment of the pixel of the liquid crystal display device according to the present invention, and it may be compared to FIG. 8C.

In the embodiment shown in FIG. 8C, the pixel electrode PX and the reflection film RF are formed on different layers by way of an insulation film. However, in the embodiment shown in FIG. 8G, the pixel electrode PX and the reflection film RF are formed of different materials; and, at the same time, the pixel electrode PX and the reflection film RF are formed in a superposed manner without interposing any insulation film therebetween. Due to such a constitution, by selecting a material having a small electric resistance as the material of the reflection film RF, the electrical resistance of the pixel electrode PX per se can be decreased.

Embodiment 3

Figure 9A:
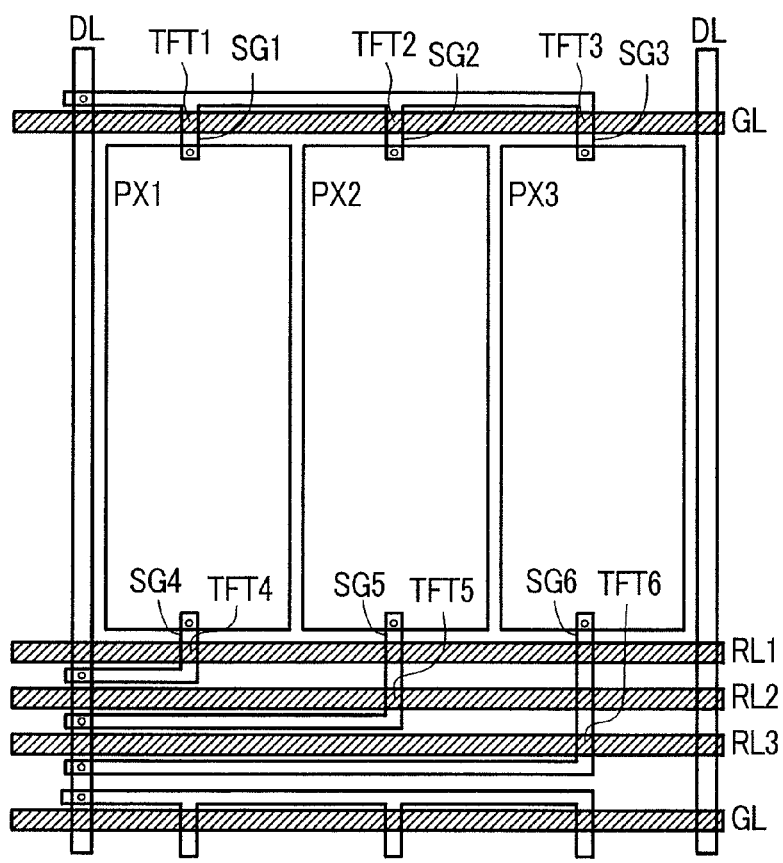
FIG. 9A is a plan view.

FIG. 9A is a plan view showing another embodiment of the pixel of the liquid crystal display panel according to the present invention.

One pixel of the liquid crystal display panel PNL is positioned between gate signal lines GL, which extend in the x direction as seen in the drawing and are arranged in parallel in the y direction as seen in the drawing, as well as between drain signal lines DL, which extend in the y direction as seen in the drawing and are arranged in parallel in the x direction as seen in the drawing.

Due to such a constitution, in a pixel region which is bounded by the respective signal lines, for example, three pixel electrodes PX1, PX2, PX3 which are arranged in the x direction are formed.

The respective pixel electrodes PX1, PX2, PX3 are electrically connected, respectively, to one end of the semiconductor layers SG1, SG2, SG3, which are arranged such that they traverse the gate signal line GL, which is arranged at an upper side as seen in the drawing and an insulation film (not shown in the drawing); while, the other ends of each of the semiconductor layers SG1, SG2, SG3 are connected in common and are electrically connected to the drain signal line DL, which is arranged at the left side of the drawing, for example. The semiconductor layers SG1, SG2, SG3 are respective semiconductor layers of thin film transistors TFT1, TFT2, TFT3; wherein, when a scanning signal is supplied to the gate signal lines GL, which are arranged to cross the thin film transistors TFT1, TFT2, TFT3, a video signal from the drain signal line DL is supplied to the respective pixel electrodes PX1, PX2, PX3.

Further, in a region defined between the respective pixel electrodes PX1, PX2, PX3 and the gate signal line GL, which is arranged at the lower side as seen in the drawing, three auxiliary scanning signal lines RL1, RL2, RL3 are formed to extend in the x direction as seen in the drawing and are arranged in parallel in the y direction.

The pixel electrode PX1 is electrically connected with the auxiliary scanning signal line RL1 and one end of the semiconductor layer SC4, which is arranged such that it traverses an insulation film (not shown in the drawing), while the other end of the semiconductor layer SC4 is electrically connected with the drain signal line DL, which is arranged at the left side as seen in the drawing. The semiconductor layer SC4 is a semiconductor layer of a thin film transistor TFT4; wherein, when a signal is supplied to the auxiliary scanning signal line RL1, which is arranged to cross the thin film transistor TFT4, a signal from the drain signal line DL (a black display signal to be described later) is supplied to the pixel electrode PX1.

In the same manner, the pixel electrode PX2 is electrically connected with the auxiliary scanning signal line RL2; and, one end of the semiconductor layer SC5 is arranged such that it traverses an insulation film (not shown in the drawing), while the other end of the semiconductor layer SC5 is electrically connected with the drain signal line DL, which is arranged at the left side as seen in the drawing. The semiconductor layer SC5 is a semiconductor layer of a thin film transistor TFT5; wherein, when a signal is supplied to the auxiliary scanning signal line RL2, which is arranged to cross the thin film transistor TFT5, a signal from the drain signal line DL (a black display signal to be described later) is supplied to the pixel electrode PX2.

In the same manner, the pixel electrode PX3 is electrically connected the auxiliary scanning signal line RL3; and, one end of the semiconductor layer SC6 is arranged such that it traverses an insulation film (not shown in the drawing), while the other end of the semiconductor layer SC6 is electrically connected with the drain signal line DL which is arranged at the left side as seen in the drawing. The semiconductor layers SC6 is a semiconductor layer of a thin film transistor TFT6; wherein, when a signal is supplied to the auxiliary scanning signal line RL3, which is arranged to cross the thin film transistors TFT6, a signal from the drain signal line DL (a black display signal to be described later) is supplied to the pixel electrode PX3.

Figure 9B:
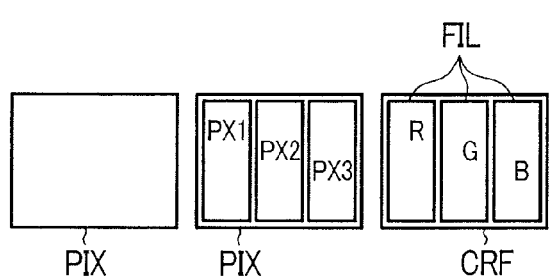
FIG. 9B is a diagram and FIG. 9C is a sectional view showing another embodiment of the liquid crystal display device according to the present invention.

The liquid crystal display panel PNL having such a constitution includes, as shown in FIG. 9B, with respect to the pixel PIX, pixel electrodes PX1, PX2, PX3 which are allocated to respective colors; and, a red color filter FIL, a green color filter FIL and a blue color filter FIL are formed on a colored reflector CRF, such that the these color filters FIL face the pixel electrodes PX1, PX2, PX3.

Figure 9C:
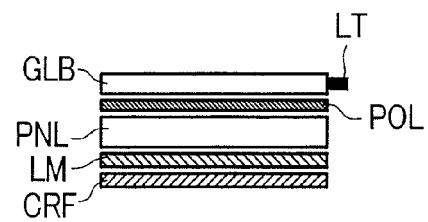

Further, the liquid crystal display device is constituted such that, as shown in FIG. 9C, a light guide plate GLB is arranged on a viewer-side surface of the liquid crystal display panel PNL, and an optical medium LM and the colored reflector CRF are sequentially arranged on a back surface of the liquid crystal display panel PNL.

According to the liquid crystal display device having such a constitution, when the light source LT is turned on, the auxiliary scanning signal line RL1, the auxiliary scanning signal line RL2 and the auxiliary scanning signal line RL3 are always turned off; and, hence, a video signal is supplied to the respective pixel electrodes PX1, PX2, PX3 from the drain signal line DL through the thin film transistors TFT1, TFT2, TFT3, which are driven in response to the supply of a scanning signal from the gate signal line GL.

Here, as the video signal used in such an operation, a gray scale signal for red, a gray scale signal for green and a gray scale signal for blue are sequentially supplied, and respective red, green and blue lights from the light guide plate GLB are irradiated in a sequentially-changed-over manner. Further, the lights from the light guide plate GLB are made to pass through or to be reflected on the pixel electrodes PX1, PX2, PX3, and, hence, the respective lights from the pixel can be recognized in a mixed state by a viewer.

Further, when the light source is turned off, at the time of sequentially displaying the pixel in the order of red→green→blue, first of all, to perform the red display, data is written in the pixel electrodes PX1, PX2, PX3 through the gate signal line GL; and, thereafter, black data is supplied to the drain signal line DL, and the auxiliary scanning signal lines RL2 and the auxiliary scanning signal lines RL3 are turned on so as to make the pixel electrode PX2, PX3 portions produce a black display. Accordingly, the pixel electrode PX1 portion produces a red display.

Next, to produce a green display, data is written in the pixel electrodes PX1, PX2, PX3 through the gate signal line GL;

and, thereafter, black data is supplied to the drain signal line DL, and the auxiliary scanning signal lines RL1 and the auxiliary scanning signal lines RL3 are turned on so as to make portions of the pixel electrode PX1, PX3 produce a black display. Accordingly, the pixel electrode PX2 portion produces a green display.

Next, to produce a blue display, data is written in the pixel electrodes PX1, PX2, PX3 through the gate signal line GL; and, thereafter, black data is supplied to the drain signal line DL, and the auxiliary scanning signal lines RL1 and the auxiliary scanning signal lines RL2 are turned on so as to make the pixel electrodes PX1, PX2 produce a black display. Accordingly, the pixel electrode PX2 portion produces a blue display.

Due to such an operation, it is possible to allow the viewer to recognize the reflection display of respective colors without lowering the resolution of the display.

Figure 10A:
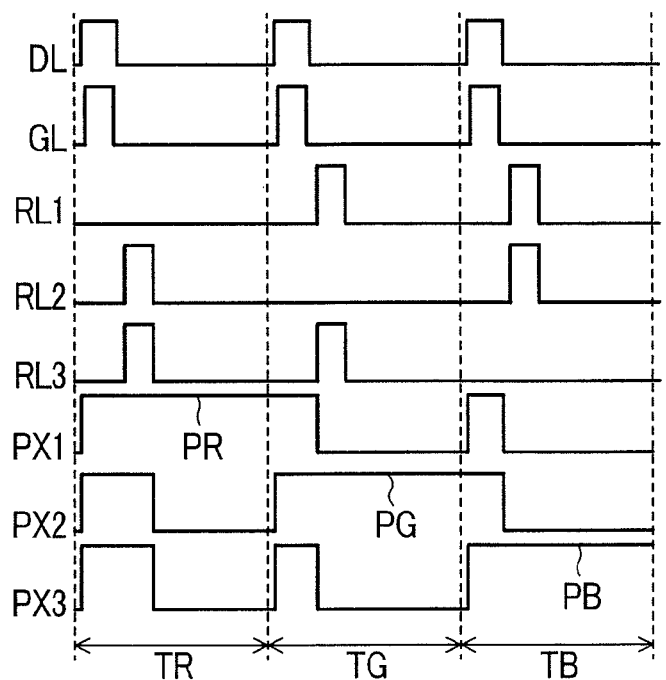
FIGS. 10A and 10B are time charts showing an embodiment of a driving method of the liquid crystal display device shown in FIG. 9A.

FIG. 10A is a timing chart showing, in the above-mentioned liquid crystal display device, respective displays of the pixel electrode PX1, the pixel electrode PX2 and the pixel electrode PX3 when the video signal is supplied to the drain signal line DL, when the scanning signal is supplied to the gate signal line GL, and when the respective signals are supplied to the auxiliary scanning signal line RL1, the auxiliary scanning signal line RL2 and the auxiliary scanning signal line RL3. The timings for supplying respective signals shown in the timing chart are as described above.

In the timing chart, TR indicates an R display period, TG indicates a G display period and TB indicates a B display period. Further, PR indicates only an R region, PG indicates only an G region and PB indicates only an B region.

Figure 10B:
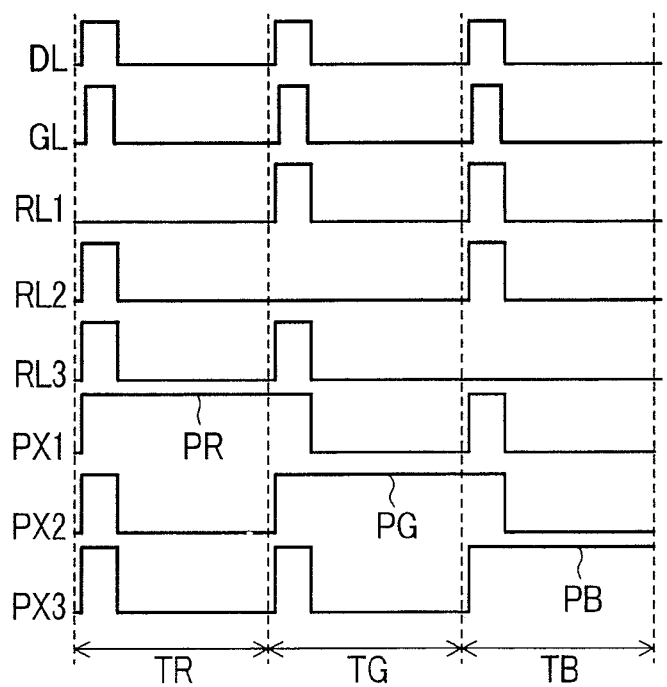

Further, FIG. 10B shows a case in which the supply of signals different from the supply of signals shown in FIG. 10A is performed. Compared to the supply of signals shown in FIG. 10A, the rise times of respective signals supplied to the auxiliary scanning signal lines RL1, the auxiliary scanning signal lines RL2 and the auxiliary scanning signal lines RL3 are overlapped with the rise times of the scanning signal supplied to the gate signal line GL and, at the same time, the falling times of the respective signals which are supplied to the auxiliary scanning signal lines RL1, the auxiliary scanning signal lines RL2 and the auxiliary scanning signal lines RL3 are made to come after the falling times of the scanning signal which is supplied to the gate signal line GL.

Due to such a constitution, it is possible to make the regions of colors, other than the color to be displayed, produce a black display in a shorter period, and, hence, a further enhancement of the color purity is obtained.

Embodiment 4

Figure 11A:
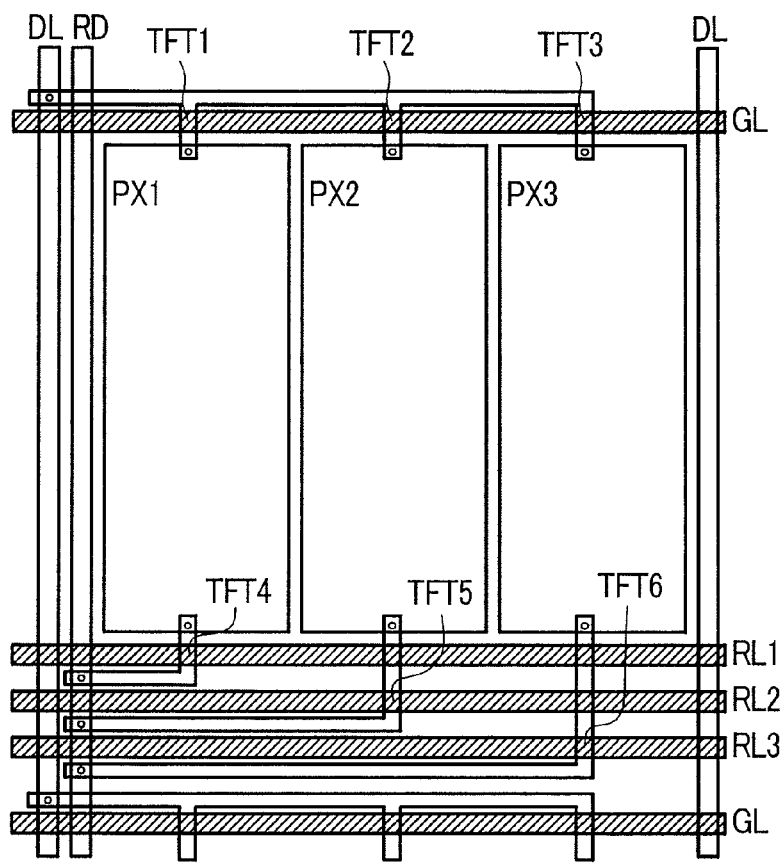
FIG. 11A is a diagrammatic plan view showing another embodiment of the liquid crystal display device according to the present invention.

FIG. 11A is a plan view showing another embodiment of the pixel of the above-mentioned liquid crystal display panel PNL, and it may be compared to FIG. 9A.

The constitution which makes this embodiment different from the embodiment shown in FIG. 9A lies in the fact that, for example, an auxiliary video signal line RD, which is used as a dedicated line for black writing, is provided close to the drain signal line DL, which supplies the video signal to the drain signal line DL, and a black signal is supplied to the respective pixel electrodes PX1, PX2, PX3 from the auxiliary video signal line RD through the thin film transistor TFT4, which is turned on by the auxiliary scanning signal line RL1, the thin film transistor TFT5, which is turned on by the auxiliary scanning signal line RL2 and the thin film transistor TFT6, which is turned on by the auxiliary scanning signal line RL3.

Due to such a constitution, it is possible to constitute the liquid crystal display device without changing the signal writing of a conventional so-called field sequential method. A potential for black display can be always supplied to the auxiliary video signal line RD. For example, in a normally black mode, a potential which is supplied to the counter electrode CT, that is, a so-called common potential, may be supplied to the auxiliary video signal line RD.

Figure 11B:
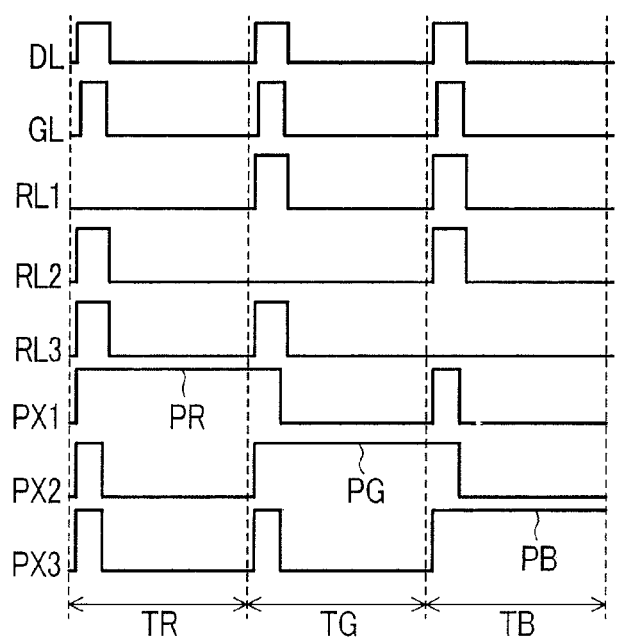
FIG. 11B is a timing chart showing an embodiment of a driving method thereof.

FIG. 11B is a timing chart showing, in the liquid crystal display panel PNL having the above-mentioned pixels, respective displays of the pixel electrode PX1, the pixel electrode PX2 and the pixel electrode PX3 when the video signal is supplied to the drain signal line DL, when the scanning signal is supplied to the gate signal line GL, when the signal is supplied to the auxiliary video signal line RD, and when the respective signals are supplied to the auxiliary scanning signal line RL1, the auxiliary scanning signal line RL2 and the auxiliary scanning signal line RL3.

Embodiment 5

Figure 12A:
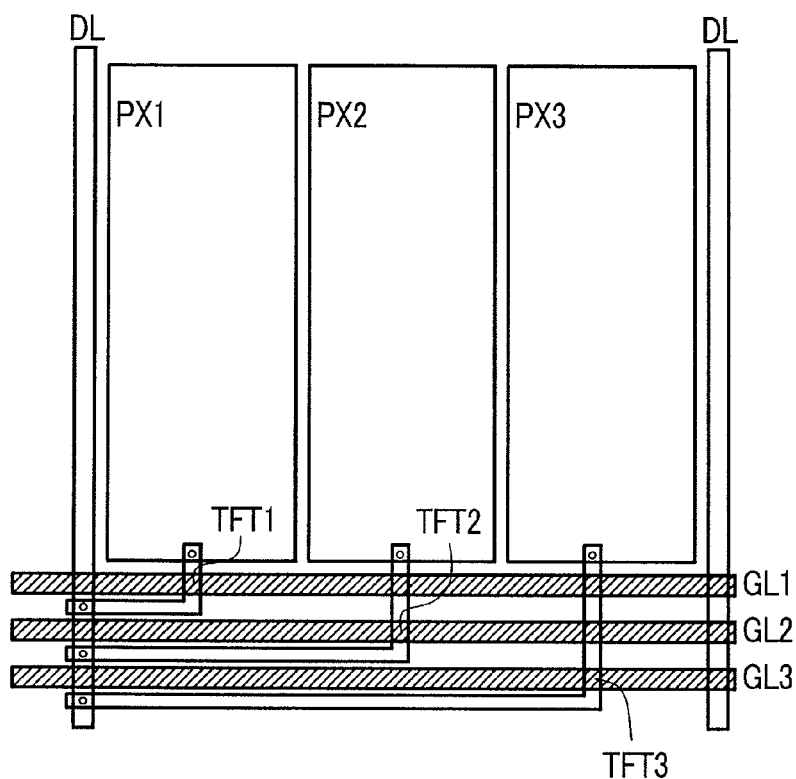
FIG. 12A is a diagrammatic plan view showing another embodiment of the liquid crystal display device according to the present invention.

FIG. 12A is a plan view showing another embodiment of a pixel of the liquid crystal display panel PNL.

In the same manner as the above-mentioned embodiment, one pixel is positioned between drain signal lines DL, which are arranged close to each other, and the pixel is provided with pixel electrodes PX1, PX2, PX3, which are arranged in parallel to each other. However, this embodiment differs from the previous embodiments in that the liquid crystal display panel PNL includes gate signal lines GL1, GL2, GL3 for independently driving the respective pixel electrodes PX1, PX2, PX3 respectively.

That is, the pixel electrode PX1 is configured to receive the video signal from the drain signal line DL, which is positioned at the left side of the pixel, for example, through the thin film transistor TFT1, while the thin film transistor TFT1 is turned on in response to the scanning signal from the gate signal line GL1. Further, the pixel electrode PX2 is configured to receive the video signal from the above-mentioned drain signal line DL through the thin film transistor TFT2, while the thin film transistor TFT2 is turned on in response to the scanning signal from the gate signal line GL2. Still further, the pixel electrode PX3 is configured to receive the video signal from the above-mentioned drain signal line DL through the thin film transistor TFT3, while the thin film transistor TFT3 is turned on in response to the scanning signal from the gate signal line GL3. Due to such a constitution, it is possible to reduce the amount of wiring compared to the above-mentioned pixel constitution.

Figure 12B:
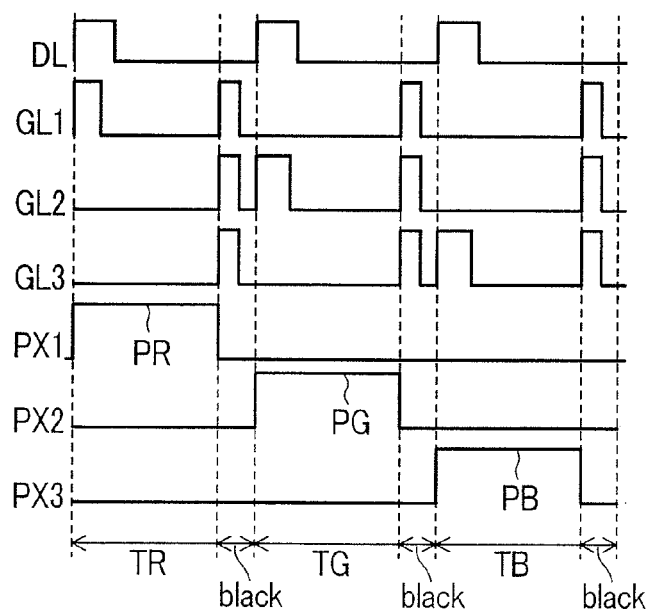
FIG. 12B is a timing chart.

FIG. 12B is a timing chart of operation in the reflection mode showing, in the liquid crystal display panel PNL having the pixels of the above-mentioned constitution, respective displays of the pixel electrode PX1, the pixel electrode PX2 and the pixel electrode PX3 when the video signal is supplied to the drain signal line DL, and when the scanning signal is supplied to the gate signal line GL1, the gate signal line GL2 and the gate signal line GL3.

The red display, the green display and the blue display are performed in a changed-over-manner on the pixel electrode PX1, the pixel electrode PX2 and the pixel electrode PX3, respectively, along with the lapse of time. In this case, however, the liquid crystal display panel PNL is configured such that the black display is produced after the display in one pixel electrode is finished and before the display in the next pixel electrode is started. That is, the scanning signal is simultaneously supplied to the respective gate signal lines GL1, GL2, GL3 when the black display is produced and black is written over the whole screen at the time of sequentially changing over between red, green and blue. Due to such a constitution, it is possible to remove the charges of colors stored in the pixel electrodes PX1, PX2, PX3 so as to prevent color mixing.

Figure 12C:
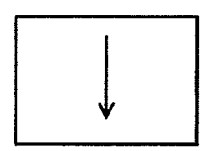
FIGS. 12C and 12D are diagrams showing an embodiment of a driving method thereof.
Figure 12D:
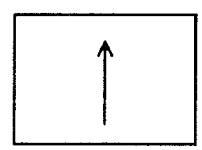
Figure 13A:
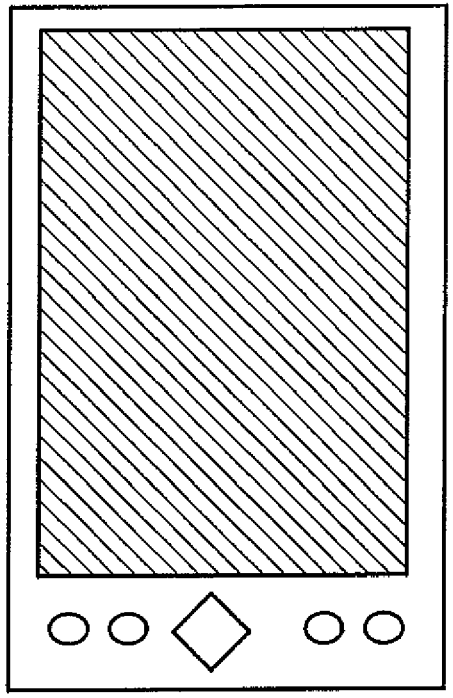
FIG. 13A is a diagram and FIG. 13B is a perspective view showing an embodiment of equipment in which the liquid crystal display device according to the present invention is incorporated.
Figure 13B:
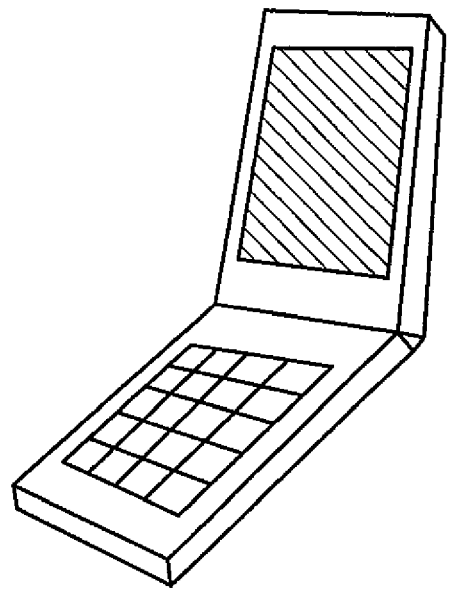

Further, in performing such an operation, the respective gate signal lines GL of the liquid crystal display panel PNL may be sequentially scanned from above to below as seen in the drawing. However, in this case, the display time of each color differs between an upper portion and a lower portion of the screen. Accordingly, as shown in FIG. 12C and FIG. 12D, it may be possible to use a case in which the respective gate signal lines GL are scanned from above to below as seen in the drawing, and a case in which the respective gate signal lines GL are scanned from below to above as seen in the drawing in a mixed form alternately for every one frame or for every plural frames. With use of such a technique, it is possible to level the in-plane brightness, thus reducing the display irregularities.

The above-mentioned embodiments may be used in a single form or in combination. This is because the advantageous effects of the respective embodiments can be obtained in a single form or synergistically.

Further, although the specific object into which the above-mentioned liquid crystal display device is incorporated is not limited, it is desirable that the liquid crystal display device is applied to a screen part of, for example, a PDA (Personal Digital Assistant), such as the one shown in FIG. 12A, or a mobile phone, such as the one shown in FIG. 12B. This is because the PDA and the mobile phone are miniaturized, and, hence, there exist many opportunities in which they are used outdoors and in which ambient light, such as sun light, can be used as the light source.

As can be readily understood from the foregoing explanation, according to the liquid crystal display device of the present invention, the liquid crystal display device has no mechanical operation mechanism, and, hence, it is possible to enhance the reliability and to realize a miniaturization of the liquid crystal display device.

What is claimed:

1. A liquid crystal display device is characterized in that:
   at least a light guide plate, which guides light from a light source, a liquid crystal display panel, an optical medium which changes over transmission and reflection of light, color filters of respective colors which constitute three primary colors and a reflector are sequentially arranged from a viewer side,
   the light source irradiates light such that the color of the irradiated light sequentially changed over with respective colors which constitute three primary colors,
   the liquid crystal display panel is divided into three pixel regions which face the respective colors of the color filters in each pixel, and
   the liquid crystal display device includes means which simultaneously supplies the video signal to the respective pixel regions and means which independently supplies a black display signal to the respective pixel regions.

2. A liquid crystal display device according to claim 1, wherein the video signal is supplied to respective pixel regions through video signal lines and the black display signal is supplied to the pixel regions through the video signal lines.

3. A liquid crystal display device according to claim 1, wherein when the light is irradiated from the light source, the black display signal is not supplied to the respective pixel regions; and, when the light is not irradiated from the light source, the video signal is supplied to the respective pixel regions and, thereafter, the black display signal is supplied to the remaining pixel regions other than the pixel regions which correspond to the color which is allocated to the video signal.

4. A liquid crystal display device according to claim 1, wherein the video signals are supplied to the respective pixel regions through video signal lines and the black display signal is supplied to the respective pixel regions through signal lines which are provided separately from the video signal lines.

5. A liquid crystal display device is characterized in that:
   at least a light guide plate, which guides light from a light source, a liquid crystal display panel, an optical medium, which changes over transmission and reflection of light, color filters of respective colors, which constitute three primary colors, and a reflector are sequentially arranged from a viewer side,
   the light source irradiates light such that the color of irradiated light is sequentially changed over among respective colors which constitute three primary colors,
   the liquid crystal display panel is divided into three pixel regions which face the respective colors of the color filters in each pixel, and
   a video signal from the same drain signal line is configured to be supplied to respective pixel electrodes of the respective pixel regions through a first thin film transistor which is driven in response to the supply of a scanning signal from a first gate signal line, through a second thin film transistor, which is driven in response to the supply of the scanning signal from the second gate signal line, and through a third thin film transistor which is driven in response to the supply of the scanning signal from the third gate signal line.

6. A liquid crystal display device according to claim 5, wherein the video signal includes a black display signal, the respective displays of the respective pixel regions are sequentially produced by changing over the respective displays of the respective pixel regions, and a black display based on the black display signal is produced at the time of changing over the display.

* * * * *